3,392,170
4-[p-(SUBSTITUTED AMINO)PHENYL]
MORPHOLINES
John J. D'Amico, Dunbar, W. Va., and Sidney T. Webster, Columbus, Ohio, assignors to Monsanto Company, St. Louis, Mo., a corporation of Delaware
No Drawing. Filed Aug. 27, 1965, Ser. No. 483,294
7 Claims. (Cl. 260—247.5)

ABSTRACT OF THE DISCLOSURE

Antiozonants of the formula

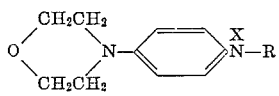

where X is hydrogen or nitroso and R is alkyl of 3 to 12 carbon atoms or cycloalkyl of 5 to 12 carbon atoms are new compounds useful for protecting natural and synthetic rubbers from ozone degradation.

---

This invention relates to a new method for protecting rubber from degradation and to new compounds having special significance as antidegradants. More particularly, the invention relates to 4-[p-(substituted amino)phenyl] morpholines and their use in rubber against ozone attack.

An object of this invention is to provide new chemical compounds which have special significance as antiozonants in rubber. A further object of this invention is to provide a method for the protection of rubber against ozone attack. Other objects of the invention will become apparent as the description proceeds.

Degradation of rubber products by ozone has been a recognized problem for a considerable time in the rubber industry. However, the rubber industry's use of rubber chemicals as antiozonants spans only the last two decades. Before this time, wax was the most used rubber protector against ozone attack. Wax is used today as an antiozonant, but its usefulness is limited. Although wax is an effective antiozonant for rubber not subject to abrasion, viz static, it is not as useful in rubber exposed to active use, viz dynamic. The chemical industry has attempted to provide antiozonants for rubber useful under both static and dynamic conditions. Santoflex AW, the Monsanto trademark for 6-ethoxy-1,2-dihydro-2,2,4-trimethylquinoline, is one of the first chemicals developed as a rubber antiozonant. Various phenylenediamines have also been explored and developed as rubber antiozonants.

In United States Patent 1,899,058, Re. 19,654, Rubber Composition and Method of Preserving Rubber, Reed to B. F. Goodrich Co. (1932), various 4-phenyl morpholines are disclosed as antioxidants or age-resistors. The hydroxy substituted aromatic nucleus ". . . appear to be the most valuable . . . ." according to the Reed patent. Reed's disclosure includes such compounds as 4-(p - amino phenyl)morpholine and 4-[p-(dimethylamino)phenyl]-2, 6-dimethyl morpholine. We have discovered that compounds, for example 4-[p-(isopropylamino)phenyl]morpholine, 4-[p-(1-methylpropylamino)phenyl]morpholine, 4-[p-(1,3-dimethylbutylamino)phenyl]morpholine, 4 - [p-(1,4-dimethylpentylamino)phenyl]morpholine, 4-[p - (1-ethyl-3-methylpentylamino)phenyl]morpholine, 4-[p - (1-methylbutylamino)phenyl]morpholine, 4-[p-(cyclohexylamino)phenyl]morpholine and 4-[p-(N - isopropyl - N-nitrosoamino)phenyl]morpholine have special significance when tested as antiozonants simultaneously with the Reed compounds. The compounds of this invention have special significance in rubber over the Reed compounds because the compounds of this invention are superior antiozonants. These superior antiozonant properties of the compounds of this invention are demonstrated in the tables, infra.

To prepare 4-[p-(isopropylamino)phenyl]morpholine, 94 grams (0.45 mole) of 4-(p-nitrophenyl)morpholine, 200 grams of acetone, 1 gram of glacial acetic acid, 75 grams of methyl alcohol and 1 gram of 5% platinum on carbon in 15 ml. of benzene are charged to a 1-liter stainless steel autoclave. The autoclave is sealed and purged twice with nitrogen. The stirred reaction mixture is reduced with hydrogen at 40° C. to 120° C. and 250 to 400 lbs. pressure per square inch gauge over a 1.5 hour period or until a theoretical amount of hydrogen is absorbed. After cooling to 60° C. the catalyst is removed by filtration. The filtrate is added to 2000 grams of ice water and stirred at 0° to 10° C. for 1 hour. The solids are collected by filtration, washed with 200 ml. of water and air dried at 25° to 30° C. The 4-[p-(isopropylamino) phenyl]morpholine, melting point 103°–104° C., is obtained in 71% yield. After recrystallization from heptane, the product melts at 104°–105° C. Nitrogen analysis of the product is 12.65% nitrogen compared to 12.72% nitrogen calculated for $C_{13}H_{20}N_2O$. Comparable results are obtained when the starting material 4-(p-nitrophenyl) morpholine is replaced with 4-(p-nitrosophenyl)morpholine.

To prepare 4-[p-(1 - methylpropylamino)phenyl]morpholine, 89 grams (0.44 mole) of 4-(p-nitrophenyl)morpholine, 225 grams of methyl ethyl ketone, 1.5 grams of glacial acetic acid, 75 grams of methyl alcohol and 2.2 grams of 5% platinum on carbon in 15 ml. of benzene are charged to a 1-liter stainless steel autoclave. The autoclave is sealed and purged twice with nitrogen. The stirred reaction mixture is reduced with hydrogen at 40° to 120° C. and 250 to 400 pounds pressure per square inch gauge over a 1.5 hour period or until a theoretical amount of hydrogen is absorbed. After cooling to 60° C., the catalyst is removed by filtration. The filtrate is added to 2000 grams of ice water and stirred at 0° to 10° C. for one hour. The solids are collected by filtration, washed with 200 ml. of water and air dried at 25°–30° C. The 4-[p-(1 - methylpropylamino)phenyl]morpholine, melting point 88°–89° C., is obtained in 74% yield. The melting point remains unchanged after recrystallization from heptane. Nitrogen analysis of the product is 11.89% nitrogen compared to 11.96% nitrogen calculated for $C_{14}H_{22}N_2O$. Comparable results are obtained when the starting material 4-(p-nitrophenyl)morpholine is replaced with 4-(p-nitrosophenyl)morpholine.

To prepare 4 - [p - (1,3-dimethylbutylamino)phenyl] morpholine, 41.6 grams (0.2 mole) of 4-(p-nitrophenyl) morpholine, 150 grams of methyl alcohol, 100 grams of methyl isobutyl ketone, 1 gram of glacial acetic acid and 1.5 grams of 5% platinum on carbon in 20 ml. of benzene are charged to a 1-liter stainless steel autoclave. The autoclave is sealed and purged twice with nitrogen. The stirred reaction mixture is reduced wtih hydrogen at 30° to 126° C. and 150 to 300 pounds pressure per square inch gauge over a 4.5 hour period or until a theoretical amount of hydrogen is absorbed. After cooling to 60° C., the catalyst is removed by filtration. The benzene, methyl alcohol and excess methyl isobutyl ketone are removed in vacuo at a maximum temperature of 178° C. at 2 mm. Hg. The product solidifies when cooled. The 4-[p-(1,3-dimethylbutylamino)phenyl]morpholine, melting point 61°–65° C., is obtained in 99% yield. The melting point is 63.5°–65.5° C. after recrystallization from ethyl alcohol. Nitrogen analysis of the product is 10.62% nitrogen compared to 10.68% nitrogen calculated for $C_{16}H_{26}N_2O$.

The prepare 4-[p-(1,4-dimethylpentylamino)phenyl] morpholine, 62.4 grams (0.3 mole) of 4-(p-nitrophenyl)

morpholine, 50 grams of methyl alcohol, 150 grams of methyl isoamyl ketone, 1.0 gram of glacial acetic acid and 1.5 grams of 5% platinum on carbon in 20 ml. of benzene are charged to a 1-liter stainless steel autoclave. The autoclave is sealed and purged twice with nitrogen. The stirred reaction mixture is reduced with hydrogen at 58° to 127° C. and 90 to 330 pounds pressure per square inch gauge over a 3-hour period or until a theoretical amount of hydrogen is absorbed. After cooling to 60° C., the catalyst is removed by filtration. The benzene, methyl alcohol and excess methyl isoamyl ketone are removed in vacuo at a maximum temperature of 190° C. at 5 mm. Hg. The product solidifies when cooled. The 4-[p-(1,4-dimethylpentylamino)phenyl]morpholine, melting point 52°–58° C., is obtained in 99% yield. The product melts at 58.0°–59.5° C. after recrystallization from ethyl alcohol. Nitrogen analysis of the product is 9.78% nitrogen compared to 10.14% calculated for $C_{17}H_{28}N_2O$.

To prepare 4-[p-(1-ethyl-3-methylpentylamino)phenyl]morpholine, 62.4 grams (0.3 mole) 4-(p-nitrophenyl)morpholine, 50 grams of methyl alcohol, 250 grams of 5-methyl-3-heptanone, 1.0 gram of glacial acetic acid and 1.5 grams of 5% platinum on carbon in 20 ml. of benzene are charged to a 1-liter stainless steel autoclave. The autoclave is sealed and purged twice with nitrogen. The stirred reaction mixture is reduced with hydrogen at 45° to 134° C. and 200 to 400 pounds pressure per square inch gauge over a 4-hour period or until a theoretical amount of hydrogen is absorbed. After cooling to 60° C., the catalyst is removed by filtration. The benzene, methyl alcohol and excess 5-methyl-3-heptanone are removed in vacuo at a maximum temperature of 204° C. at 5 mm. Hg. The product solidifies when cooled. The 4-[p-(1-ethyl-3-methylpentylamino)phenyl]morpholine, melting point 55°–60° C., is obtained in 97.5% yield. The product melts at 65°–66° C. after recrystallization from heptane. Nitrogen analysis of the product is 9.10% nitrogen compared to 9.65% nitrogen calculated for $C_{18}H_{30}N_2O$.

The preparation of 4-[p-(1-methylbutylamino)phenyl]morpholine is substantially the same as the preparation of 4-[p-(1-ethyl - 3 - methylpentylamino)phenyl]morpholine described above, except methyl propyl ketone is used as a starting material instead of 5-methyl-3-heptanone. The catalyst is removed from the product by filtration. The filtrate obtained is added to 2500 grams of ice water and stirred at 0° to 10° C. for 1 hour. The solids are collected by filtration, washed with water until the washings are neutral to litmus and air dried at 25° to 30° C. The 4-[p-1-methylbutylamino)phenyl]morpholine, melting point 80°–81° C., is obtained in 99% yield. The melting point is unchanged after recrystallization from heptane. Nitrogen analysis of the product is 11.30% nitrogen compared to 11.28% nitrogen calculated for $C_{15}H_{24}N_2O$.

The preparation of 4-[p-(cyclohexylamino)phenyl]morpholine is substantially the same as the preparation of 4-[p-(1-ethyl-3 - methylpentylamino)phenyl]morpholine described above, except cyclohexanone is used as a starting material instead of 5-methyl-3-heptanone. The catalyst is removed from the product by filtration. The filtrate is cooled to 0° C., and the resulting solids are collected by filtration and air dried at 25° to 30° C. The 4-(p-(cyclohexylamino)phenyl]morpholine, a white solid melting at 128°–129° C., is obtained in 69.5% yield. Nitrogen analysis of the product is 10.83% nitrogen compared to 10.76% nitrogen calculated for $C_{16}H_{24}N_2O$.

To prepare 4-[p-(N-isopropyl-N-nitrosoamino)phenyl]morpholine, a stirred charge containing 44 grams (0.2 mole) of 4-[p-(isopropylamino)phenyl]morpholine in 200 ml. of isopropyl alcohol is heated to 50° C. for solution. After cooling to 25° C., 28 grams (0.28 mole) of concentrated hydrochloric acid is added at 25° to 30° C. over a five-minute period. To this stirred solution, 15.4 grams (0.22 mole) of 98% sodium nitrite in 30 ml. of water is added subsurface at 25° to 30° C. over a period of 15 minutes. After stirring at 25° to 30° C. for 1 hour, 6 grams of concentrated ammonium hydroxide in 600 ml. of water is added, and stirring is continued for 15 minutes. The solids are collected by filtration, washed with water until the washings are neutral to litmus and air dried at 25° to 30° C. The 4-[p-(N-isopropyl- N - nitrosoamino)phenyl]morpholine, melting point 77°–79° C., is obtained in 94.4% yield. A melting point of 89°–90° C. is obtained after recrystallization from ethyl alcohol. Nitrogen analysis of the product is 16.38% nitrogen compared to 16.86% nitrogen calculated for $C_{13}H_{19}N_3O$.

Rubber ozone resistance data for the compounds of this invention are reported in the following tables. The method used for measuring the ozone damage to vulcanized rubber is described by Decker and Wise, The Stress Relaxation Method for Measuring Ozone Cracking, Rubber World, April 1962, p. 66. The equipment used in these tests is comprised of a Blue M Oven used as an ozone cabinet. This is a product of the Blue M Electric Company of Blue Island, Ill. The cabinet is modified with Hanovia ozone generating equipment. Six quartz lamps are installed in the air chamber beneath the oven floor. The ozone concentration in the cabinet is controlled with the lamps. The ozone concentration in the chamber can be controlled within ±5 from 10 to 200 parts per hundred million parts of air. The cabinet is equipped with a rack for static testing and one for dynamic testing. The static rack handles 12 stocks at strains of 5, 10, 20, 30 and 40%. The dynamic tester is a reciprocal mechanism which imparts a 25% strain to the rubber test pieces. The top plate of the dynamic tester moves up and down, and the bottom plate is stationary. The tester is driven at a rate of 90 cycles per minute by a gear motor mounted on the outside of the cabinet. The test pieces of rubber are two-inch long T–50 (ASTM W 599–55) specimens dried from standard stress strain test sheets (ASTM D 15–57T). They are mounted by placing their ends in the radial slots milled into the edges of the circular plates of the racks. The tab ends fit into the circumferential grooves machined into the outer surfaces of the plates.

The stress relaxation method is based on the principle that the effective cross-sectional area of a small test piece of rubber is reduced by ozone cracking. The extent of cracking in a test piece is determined by measuring the forces required to extend the test piece 100% before and after exposure to ozone. As the strip begins to crack, the number of stress-supporting rubber chains decreases, and the force required to extend the strip 100% is reduced. The ratio of this force to the original force is calculated at approximately sixteen-hour intervals of exposure to ozone. The graph of force vs. time is essentially a straight line, and the time required for attaining 90%, 80%, and 70% of the original force is readily determined from the graph. The ability of the rubber to resist ozone attack is obtained by comparison of these numbers. These ratios are the percent of original modulus of the rubber test piece and are listed as percent retention in the tables, infra. The ozone concentration for the tests is 25 parts ozone per hundred million parts of air. Longer times in the data demonstrate better ozone resistance of the rubber stock. The intermittent test comprises two-hour cycles during which the specimens are exposed dynamically 15% of the time and during the remaining time of the cycle are exposed statically at 25% strain.

The stocks of Table I are vulcanized rubber stocks comprised of a B–1 SBR base stock containing 100 parts styrene-butadiene rubber 1500, 50 parts Philblack O which is high abrasion furnace carbon black, 4 parts zinc oxide, 2 parts stearic acid and 10 parts Necton 60 which is a hydrocarbon softener. Added to the base stock are 1.0 part Santocure NS which is the accelerator N-tert.- butyl-2-benzothiazolesulfenamide, 1.75 parts sulfur and 2 parts of the listed antiozonant.

The stocks of Table I contain the following antiozonants:

Stocks:
1—This stock is a blank containing no antidegradant
2—4-[p-(isopropylamino)phenyl]morpholine
3—4-[p-(1-methylpropylamino)phenyl]morpholine
4—4-[p-(1,3-dimethylbutylamino)phenyl]morpholine
5—4-[p-(1,4-dimethylpentylamino)phenyl]morpholine
6—4-[p-(1-ethyl-3-methylpentylamino)phenyl]morpholine
7—4-[p-(dimethylamino)phenyl]2,6-dimethyl morpholine (Reed's U.S. Patent 1,899,058, Re. 19,654).

TABLE I

| Stock | 1 hr. | 2 hrs. | 3 hrs. | 4 hrs. | 5 hrs. | 6 hrs. | 7 hrs. |
|---|---|---|---|---|---|---|---|
| Unaged Dynamic Ozone Resistance: | | | | | | | |
| 90% Retention | 5 | 31 | 30 | 26 | 23 | 22 | 13 |
| 80% Retention | 11 | 52 | 58 | 50 | 48 | 47 | 30 |
| 70% Retention | 18 | 70 | 79 | 70 | 70 | 69 | 51 |
| Unaged Static Ozone Resistance: | | | | | | | |
| 90% Retention | 2 | 12 | 12 | 7 | 7 | 8 | 7 |
| 80% Retention | 7 | 27 | 27 | 18 | 17 | 17 | 16 |
| 70% Retention | 12 | 47 | 48 | 32 | 31 | 28 | 27 |
| Aged Dynamic Ozone Resistance: | | | | | | | |
| 90% Retention | 6 | 22 | 23 | 21 | 23 | 23 | 9 |
| 80% Retention | 12 | 44 | 48 | 43 | 44 | 48 | 21 |
| 70% Retention | 18 | 64 | 71 | 66 | 64 | 70 | 41 |
| Aged Static Ozone Resistance: | | | | | | | |
| 90% Retention | 3 | 10 | 10 | 8 | 7 | 7 | 4 |
| 80% Retention | 9 | 21 | 21 | 19 | 16 | 16 | 11 |
| 70% Retention | 14 | 37 | 35 | 32 | 26 | 28 | 21 |
| Unaged Intermittent Ozone Resistance: | | | | | | | |
| 90% Retention | 2 | 21 | 27 | 15 | 12 | 15 | 10 |
| 80% Retention | 7 | 47 | 53 | 36 | 33 | 32 | 22 |
| 70% Retention | 12 | 67 | 77 | 60 | 57 | 52 | 41 |
| Aged Intermittent Ozone Resistance: | | | | | | | |
| 90% Retention | 3 | 16 | 14 | 14 | 10 | 11 | 4 |
| 80% Retention | 9 | 34 | 34 | 32 | 27 | 27 | 13 |
| 70% Retention | 14 | 54 | 57 | 52 | 50 | 48 | 30 |

By totaling the number of hours that a rubber stock retains the described percentages of the stock's original modulus, a comparison of the stocks can be made. These comparisons illustrate the special significance of the compounds of this invention. While the compound of stock 7 shows 94 hours total under unaged dynamic conditions, in contrast 4-[p-(isopropylamino)phenyl]morpholine of stock 2 demonstrates that it takes 153 hours to deteriorate the rubber to the same degree under the same conditions. This is a 63% increase in efficiency over the compound of stock 7. The compound 4-[p-(methylpropylamino)phenyl]morpholine of stock 3 demonstrates a 78% increase in efficiency over stock 7 under dynamic conditions. The remaining stocks demonstrate the following percentage increases in efficiency under unaged dynamic conditions over stock 7: Stock 4, 4-[p-(1,3-dimethylbutylamino)phenyl]morpholine, 55%; stock 5, 4-[p-(1,4-dimethylpentylamino)phenyl]morpholine, 50%; and stock 6, N - [p - (1 - ethyl - 3 - methylpentylamino)phenyl]morpholine, 47%. The special significance of the compounds of this invention, as compared to the compound of stock 7, is demonstrated more dramatically by comparison of the data for the aged dynamic ozone resistance tests. The percentage increases in efficiency of the antiozonants of this invention over stock 7 in aged dynamic ozone resistance tests are as follows: Stock 6, 99% increase; stock 5, 84% increase; stock 4, 84% increase; stock 3, 100% increase; and stock 2, 84% increase.

Table II illustrates the special significance of the compounds of this invention when used as antiozonants in natural rubber. The unaged dynamic properties of two compounds of this invention are shown in Table II. Stock 1 is a blank. Stock 2 is 4-[p-(isopropylamino)phenyl]morpholine, already shown to have special significance in Table I. Stock 3 is 4-[p-(1-methylpropylamino)phenyl]morpholine, and stock 4 is the compound 4-[p-(dimethylamino)phenyl]2,6-dimethyl morpholine. The natural rubber masterbatch for the stocks of Table II is an A-1 base stock comprises of 100 parts natural rubber, 50 parts high abrasion furnace black, 3 parts stearic acid, 5 parts zinc oxide and 3 parts hydrocarbon softener. Other additives are sulfur in 2.5 parts and Santocure NS in 0.50 part. The concentration of the antiozonants is 2.0 parts.

TABLE II

| | Stocks | | | |
|---|---|---|---|---|
| | 1 | 2 | 3 | 4 |
| Unaged Dynamic Ozone Resistance: | | | | |
| 90 Percent Retention, hrs | 18 | 26 | 22 | 14 |
| 80 Percent Retention, hrs | 15 | 64 | 56 | 48 |
| 70 Percent Retention, hrs | 23 | 92 | 92 | 93 |

4-[p-(cyclohexylamino)phenyl]morpholine was tested in a B-1 SBR base stock which is described, supra. Table III illustrates the antiozonant properties of this compound which is in stock 1 compared to another compound of this invention, 4-[p-(isopropylamino)phenyl] morpholine which is in stock 2. The concentration of each antiozonant illustrated in the stocks of Table III is 3 parts per hundred rubber. Sulfur is present in 1.75 parts. Each stock contains 1 part Santocure NS.

TABLE III

| | Stocks | |
|---|---|---|
| | 1 | 2 |
| Unaged Dynamic Ozone Resistance: | | |
| 90 Percent Retention, hrs | 28 | 31 |
| 80 Percent Retention, hrs | 57 | 51 |
| 70 Percent Retention, hrs | 85 | 70 |

Table III illustrates that stock 1 containing 4-[p-(cyclohexylamino)phenyl]morpholine, is an even more efficient antiozonant that the compound of stock 2, 4-[p-(isopropylamino)phenyl]morpholine, under unaged dynamic conditions.

The compound 4 - [p - (N - isopropyl-N-nitrosoamino)phenyl] morpholine of this invention demonstrates comparable antiozonant properties to the highly effective 4-[p-(isopropylamino)phenyl] morpholine also of this invention. Table IV illustrates the comparison of the two compounds. The natural rubber stocks are A-1 base stocks described, supra. The natural rubber stocks contain the additives sulfur in 2.50 parts per hundred rubber and Santocure NS in 0.50 part. The antiozonant concentrations are 1.5 parts. The SBR stocks are B-1 base stocks described, supra. The additives in the SBR stocks are 1.75 parts sulfur per hundred parts rubber and 1.0 part Santocure NS. The antiozonant concentrations are 1.50 parts. Stock 1 is a blank, stock 2 is 4-[p-(N-isopropyl-N-nitrosoamino)phenyl]morpholine, and stock 3 is 4-[p-(isopropylamino)phenyl]morpholine.

TABLE IV

| | Stocks | | |
|---|---|---|---|
| | 1 | 2 | 3 |
| NATURAL RUBBER | | | |
| Unaged Dynamic Ozone Resistance: | | | |
| 90 Percent Retention, hrs | 2 | 9 | 10 |
| 80 Percent Retention, hrs | 5 | 27 | 26 |
| 70 Percent Retention, hrs | 9 | 57 | 51 |
| Unaged Static Ozone Resistance: | | | |
| 90 Percent Retention, hrs | 1 | 7 | 7 |
| 80 Percent Retention, hrs | 3 | 18 | 18 |
| 70 Percent Retention, hrs | 7 | 39 | 39 |
| SBR | | | |
| Unaged Dynamic Ozone Resistance: | | | |
| 90 Percent Retention, hrs | 3 | 11 | 12 |
| 80 Percent Retention, hrs | 7 | 22 | 26 |
| 70 Percent Retention, hrs | 12 | 37 | 40 |
| Unaged Static Ozone Resistance: | | | |
| 90 Percent Retention, hrs | 1 | 7 | 5 |
| 80 Percent Retention, hrs | 2 | 12 | 11 |
| 70 Percent Retention, hrs | 6 | 18 | 20 |

The general formula for the antiozonants of this invention is

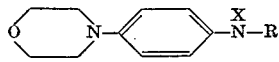

where X is hydrogen or NO, R is alkyl of 3 to 12 carbon atoms but preferably 3 to 8 or R is cycloalkyl of 5 to 12 carbon atoms. The antiozonants of this invention are effective in amounts as low as 0.2 part per hundred rubber. The concentrations can range as high as 10 parts per hundred rubber, but concentrations of 1.5 to 3 parts are preferred. Antiozonant properties comparable to those illustrated in natural rubber and SBR are obtained with oil extended styrene-butadiene rubber, cis-4-polybutadiene, butyl rubber, ethylene-propylene terpolymers, polymers of 1,3-butadiene, for example 1,3-butadiene itself, and of isoprene and copolymers of 1,3-butadiene with other monomers, for example styrene acrylonitrile, isobutylene and methyl methacrylate.

It is intended to cover all changes and modifications of the examples of the invention herein chosen for purposes of disclosure which do not constitute departures from the spirit and scope of the invention.

What is claimed is:
1. A compound of the formula

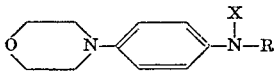

wherein X is H or NO; and wherein R is secondary alkyl of 3 to 12 carbon atoms or cycloalkyl of 5 to 12 carbon atoms.

2. 4-[p-(isopropylamino)phenyl]morpholine of the formula

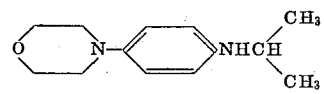

3. 4-[p-(1-methylpropylamino)phenyl]morpholine of the formula

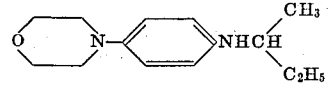

4. 4 - [p-(1,3-dimethylbutylamino)phenyl]morpholine of the formula

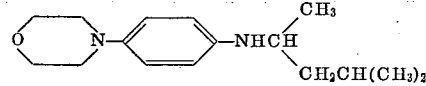

5. 4-[p-(cyclohexylamino)phenyl]morpholine of the formula

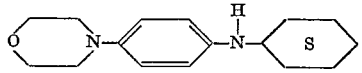

6. 4 - [p-(N-isopropyl-N-nitrosoamino)phenyl]morpholine of the formula

7. 4 - [p - (1-methylbutylamino)phenyl]morpholine of the formula

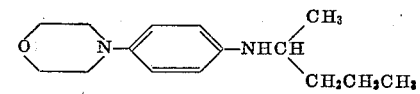

References Cited
UNITED STATES PATENTS

| | | | |
|---|---|---|---|
| 1,937,844 | 12/1933 | Reed | 95—88 |
| 1,915,334 | 6/1933 | Salzberg et al. | 260—243 |
| 2,075,359 | 3/1937 | Salzberg et al. | 167—22 |

NICHOLAS S. RIZZO, *Primary Examiner.*

JOSE TOVAR, *Examiner.*